(12) United States Patent
Kim et al.

(10) Patent No.: US 10,446,812 B2
(45) Date of Patent: Oct. 15, 2019

(54) BATTERY PACK AND MANUFACTURING METHOD THEREFOR

(71) Applicant: LG CHEM, LTD., Seoul (KR)

(72) Inventors: Ki-Youn Kim, Daejeon (KR);
Duck-Hee Moon, Daejeon (KR);
Jun-Yeob Seong, Daejeon (KR);
Sung-Chun Yu, Daejeon (KR);
Gang-U Lee, Daejeon (KR);
Jung-Hang Lee, Daejeon (KR);
Sang-Yoon Jeong, Daejeon (KR);
Yong-Joon Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 144 days.

(21) Appl. No.: 15/555,703

(22) PCT Filed: Apr. 28, 2016

(86) PCT No.: PCT/KR2016/004482
§ 371 (c)(1),
(2) Date: Sep. 5, 2017

(87) PCT Pub. No.: WO2016/175591
PCT Pub. Date: Nov. 3, 2016

(65) Prior Publication Data
US 2018/0053921 A1  Feb. 22, 2018

(30) Foreign Application Priority Data

Apr. 30, 2015 (KR) .......................... 10-2015-0061978

(51) Int. Cl.
*H01M 2/10* (2006.01)
*H01M 10/052* (2010.01)
(Continued)

(52) U.S. Cl.
CPC ....... *H01M 2/1077* (2013.01); *H01M 2/0237* (2013.01); *H01M 2/0287* (2013.01);
(Continued)

(58) Field of Classification Search
CPC ............. H01M 2/1077; H01M 2/0456; H01M 10/647; H01M 10/052; H01M 10/058
See application file for complete search history.

(56) References Cited

U.S. PATENT DOCUMENTS

2006/0177733 A1  8/2006  Ha et al.
2007/0037052 A1  2/2007  Jeon et al.
(Continued)

FOREIGN PATENT DOCUMENTS

JP  2006-32224 A  2/2006
KR  10-0696631 B1  3/2007
(Continued)

OTHER PUBLICATIONS

International Search Report issued in PCT/KR2016/004482 (PCT/ISA/210), dated Sep. 28, 2016.

*Primary Examiner* — Jonathan G Jelsma
(74) *Attorney, Agent, or Firm* — Birch, Stewart, Kolasch & Birch, LLP

(57) ABSTRACT

The present disclosure relates to a battery pack having improved assemblability, processability, and durability, and configured to stably maintain a stack of cartridges. According to an aspect of the present disclosure, the battery pack includes: vertically arranged secondary cells each including an electrode assembly, an electrolyte, and a pouch-type case; vertically stacked cartridges accommodating the secondary cells in inner spaces thereof and including coupling holes; a lower end plate including a plate-shaped metallic material and placed on a lower portion of a stack of the secondary cells and the cartridges; a first fastening member fixed to the
(Continued)

lower end plate; and a second fastening member having an elongated shape so as to stand on the lower end plate in a direction perpendicular to the lower end plate, a lower end portion of the second fastening member coupled to the first fastening member, the second fastening member being inserted through coupling holes of the cartridges.

14 Claims, 9 Drawing Sheets

(51) Int. Cl.
  *H01M 2/04* (2006.01)
  *H01M 10/058* (2010.01)
  *H01M 2/02* (2006.01)
  *H01M 2/08* (2006.01)

(52) U.S. Cl.
  CPC ........... *H01M 2/0456* (2013.01); *H01M 2/08* (2013.01); *H01M 10/058* (2013.01); *H01M 2/0207* (2013.01); *H01M 2220/20* (2013.01)

(56) References Cited

U.S. PATENT DOCUMENTS

| 2012/0045686 | A1  | 2/2012  | Jung |
| 2012/0121959 | A1* | 5/2012  | Yamada ................... B60K 1/04 429/100 |
| 2012/0315508 | A1* | 12/2012 | Kurita ................. H01M 2/1077 429/7 |
| 2013/0122339 | A1  | 5/2013  | Chae et al. |
| 2013/0149571 | A1  | 6/2013  | Lee et al. |
| 2014/0072855 | A1* | 3/2014  | Schaefer ............. H01M 2/1072 429/120 |
| 2015/0295283 | A1  | 10/2015 | Eom et al. |
| 2015/0303415 | A1  | 10/2015 | Kayano et al. |
| 2016/0056427 | A1  | 2/2016  | Kim et al. |

FOREIGN PATENT DOCUMENTS

| KR | 10-2012-0081821 A | 7/2012 |
| KR | 10-1173870 B1 | 8/2012 |
| KR | 10-2013-0033597 A | 4/2013 |
| KR | 10-2015-0044599 A | 4/2015 |
| KR | 10-2015-0044800 A | 4/2015 |
| WO | WO 2012/023732 A2 | 2/2012 |
| WO | WO 2014/073443 A1 | 5/2014 |
| WO | WO 2014/185567 A1 | 11/2014 |

* cited by examiner

BATTERY PACK AND MANUFACTURING METHOD THEREFOR

TECHNICAL FIELD

The present application claims priority to Korean Patent Application No. 10-2015-0061978 filed on Apr. 30, 2015 in the Republic of Korea, the disclosure of which is incorporated herein by reference.

The present disclosure relates to a battery including at least one secondary cell, and more particularly, to a battery pack having improved assemblability and configured to guarantee stable fixing strength between secondary cells and cartridges, and an automobile including the battery pack, and a method of manufacturing the battery pack.

BACKGROUND ART

Examples of currently commercialized secondary cells include nickel-cadmium cells, nickel-metal hydride cells, nickel-zinc cells, and lithium secondary cells. Among such various secondary cells, lithium secondary cells are freely rechargeable because of having substantially no memory effect compared with nickel-based secondary cells, and have a very low self-discharge rate and high energy density. Owing to these merits, there has been high interest in lithium secondary cells.

In general, lithium secondary cells use a lithium-based oxide as a positive electrode active material and a carbonaceous material as a negative electrode active material. A lithium secondary cell may include: an electrode assembly in which a positive electrode plate coated with such a positive electrode active material and a negative electrode plate coated with such a negative electrode active material are disposed with a separator therebetween; and a case, that is, a cell case in which the electrode assembly and an electrolytic solution are sealed.

In general, according to case types, lithium secondary cells may be classified into a can type in which an electrode assembly is accommodated in a metal can, and a pouch type in which an electrode assembly is accommodated in a pouch formed of an aluminum laminate sheet.

In recent years, secondary cells have been widely used not only in small-sized devices such as portable electronic devices, but also in medium to large-sized devices such as automobiles or power storage devices. For use in such medium to large-sized devices, a large number of secondary cells may be electrically connected to increase capacity and output power. In particular, pouch-type secondary cells are widely used in medium to large-sized devices owing to merits such as lightness and ease of stacking.

In the related art, when a battery pack is constructed by stacking a plurality of pouch-type secondary cells and a plurality of cartridges to form a cell assembly and accommodating the cell assembly in a pack case, end plates may be provided on both the outermost sides of the cell assembly in the stacking direction of the pouch-type secondary cells. In general, the end plates are formed of a metallic material and have a function of protecting and fixing secondary cells and cartridges and maintaining surface pressure.

In addition, the end plates may be coupled to the cell assembly using fastening members such as bolts. That is, bolts may be inserted through the end plates and the cell assembly, and then both ends of the bolts may be fixed to maintain the coupling between the end plates and the cell assembly. Particular, in many cases, the bolts are inserted into cartridge holes in a state in which ends of the bolts are fixed to an end plate.

In this case, the angle between the end plate and the bolts may have effects on the assemblability and quality of the battery pack. That is, when the angle between the end plate and the bolts is a right angle, the bolts may be easily inserted into the cartridge holes, and a process of assembling the end plate and cartridges and a process of assembling the cartridges may be precisely performed. However, if the angle between the end plate and the bolts is not a right angle, the bolts may not be easily inserted into the cartridge holes.

In particular, when the cartridges are vertically stacked, the cartridge holes may be connected to each other in a direction perpendicular to a surface on which the cartridges are stacked. Therefore, if the angle between end plate and the bolts is not a right angle, when the cartridges are stacked while inserting the bolts into the cartridge holes, the cartridges may not be precisely stacked. In addition, during a process of stacking the cartridges, the angle between the end plate and the bolts may be adjusted to precisely stack the cartridges. In this case, however, the bolts or the end plate may be broken or deformed, and thus the cartridges may not be properly fixed by the bolts.

DISCLOSURE

Technical Problem

The present disclosure is designed to solve the problems of the related art, and therefore the present disclosure is directed to providing a battery pack having improved assemblability, processability, and durability, and configured to stably maintain the stacked structure of cartridges, a method of manufacturing the battery pack, and an automobile including the battery pack.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

To achieve the objectives, the present disclosure provides a battery pack including: a plurality of secondary cells arranged in a vertical direction, each of the secondary cells including an electrode assembly, an electrolyte, and a pouch-type case; a plurality of cartridges accommodating the secondary cells in inner spaces thereof, including coupling holes, and stacked in the vertical direction; a lower end plate including a plate-shaped metallic material and placed on a lower portion of a stack of the secondary cells and the cartridges; a first fastening member fixed to the lower end plate; and a second fastening member having an elongated shape so as to stand on the lower end plate in a direction perpendicular to the lower end plate, a lower end portion of the second fastening member being coupled to the first fastening member, the second fastening member passing through the coupling holes of the cartridges.

The first fastening member may include a nut, and the second fastening member may include a bolt.

Furthermore, threads may be formed on both ends of the second fastening member, and the thread formed on a lower end of the second fastening member may be coupled to a thread of the first fastening member.

Furthermore, the first fastening member may be fixed to the lower end plate by welding.

Furthermore, a through-hole may be formed in the lower end plate, and the first fastening member may include: an insertion portion inserted in the through-hole of the lower end plate; and a welding portion placed on a lower portion of the lower end plate and welded to a lower surface of the lower end plate.

Furthermore, the second fastening member may have a cylinder shape and may include a polygonal protrusion on at least a portion thereof along an outer circumferential surface of the second fastening member.

Furthermore, the battery pack may further include a pack case accommodating the secondary cells and the cartridges in an inner space thereof.

Furthermore, the pack case may include: a lower case including an empty inner space and an open upper side; and an upper case coupled to the open upper side of the lower case to seal the open upper side.

Furthermore, the lower end plate and the first fastening member may be embedded in the lower case, and the second fastening member may protrude into the inner space of the lower case.

Furthermore, the second fastening member may protrude upward from the upper case, and an upper end portion of the second fastening member may be coupled to a third fastening member.

Furthermore, the battery pack may further include an upper end plate including a plate-shaped metallic material and placed on an upper portion of the stack of the secondary cells and the cartridges to cover upper portions of the secondary cells and the cartridges, and the second fastening member may be passed through the upper end plate.

Furthermore, the battery pack may further include an electronic-component plate having a plate shape and provided on an upper portion of the stack of the secondary cells and the cartridges, at least one of a BMS, a current sensor, a relay, and a fuse being mounted on the electronic-component plate, wherein the second fastening member may be inserted through the electronic-component plate.

In addition, to achieve the objectives, the present disclosure provides an automobile including the battery pack.

In addition, to achieve the objectives, the present disclosure provides a method of manufacturing a battery pack, the method including: fixing a first fastening member to a lower end plate including a plate-shaped metallic material; coupling a second fastening member extending long in one direction to the first fastening member in such a manner that the second fastening member stands on the lower end plate in a direction perpendicular to the lower end plate; and stacking cartridges in such a manner that the cartridges accommodate secondary cells and the second fastening member is passed through coupling holes of the cartridges.

Here, the fixing of the first fastening member may include welding the first fastening member to the lower end plate.

Furthermore, between the coupling of the second fastening member and the stacking of the cartridges, the method may further include embedding the lower end plate and the first fastening member in a lower case having an inner space and an open upper side.

Furthermore, after the stacking of the cartridges, the method may further include: coupling an upper case to an open upper side of a lower case in a state in which the second fastening member is inserted through the upper case; and coupling a third fastening member to an upper end of the second fastening member protruding upward from the upper case.

Advantageous Effects

According to an aspect of the present disclosure, fastening members such as bolts may be stably placed at right angles to an end plate, and thus the assemblability and processability of the battery pack may be improved. In particular, according to this aspect of the present disclosure, a process of inserting bolts into cartridges may be easily performed, and the cartridges may be precisely stacked owing to the bolt insertion process.

In addition, according to an aspect of the present disclosure, bolts are not welded, and thus the bolts may not be deformed or deviated from a right-angle position during a welding process.

In addition, according to an aspect of the present disclosure, bolts may be easily precisely placed at a right-angle position, and thus when cartridges are coupled to the bolts, it is unnecessary to largely change the angle of the bolts so as to precisely stack the cartridges. Therefore, according to this aspect of the present disclosure, bolts or the end plate may not be broken, and the coupling between the cartridges may be stably maintained owing to the bolts.

Therefore, according to these aspects of the present disclosure, even when the battery pack is impacted or vibrated during use, inner elements of the battery pack such as secondary cells or cartridges may not be relatively moved, and thus breakage of such inner elements may be prevented.

In addition, according to an embodiment of the present disclosure, the lower end plate may be embedded in the pack case. According to this configuration of the present disclosure, the rigidity of the pack case may be enhanced, and the lower end plate may be stably maintained without relative movement. Thus, the cartridges coupled to the lower end plate and the secondary cells accommodated in the cartridges may be more securely fixed. In addition, according to this configuration of the present disclosure, fastening parts for fixing the lower end plate to the inside of the pack case are not required, thereby improving the spatial efficiency of the battery pack, simplifying the structure of the battery pack, and decreasing the manufacturing costs and time of the battery pack.

DESCRIPTION OF DRAWINGS

The accompanying drawings illustrate preferred embodiments of the present disclosure and together with the foregoing disclosure, serve to provide further understanding of the technical features of the present disclosure, and thus, the present disclosure is not construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
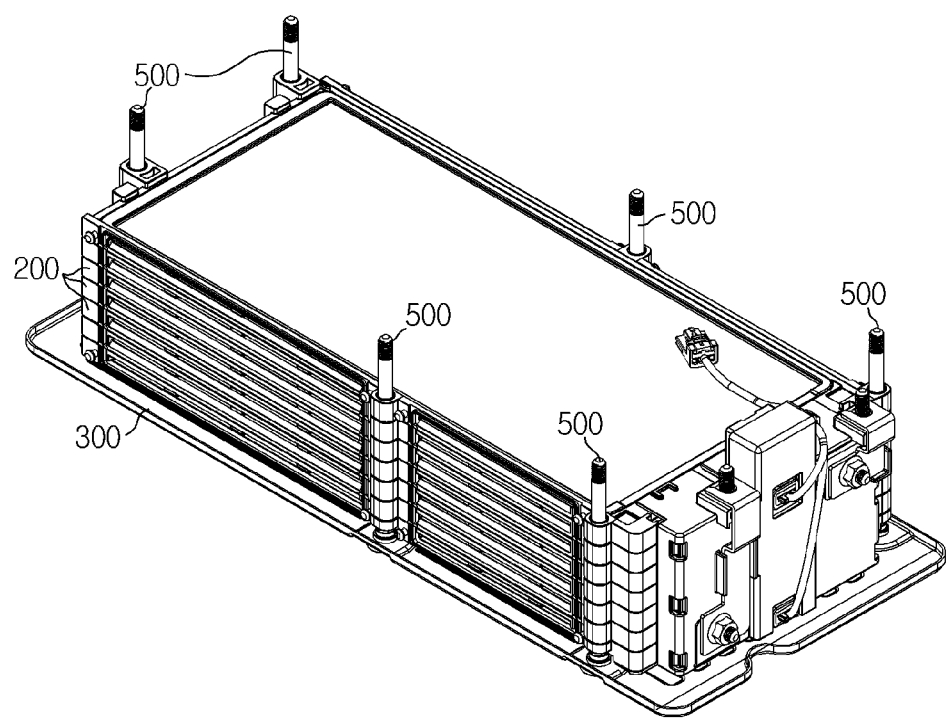
FIG. 1 is an assembled perspective view partially schematically illustrating a partial configuration of a battery pack according to an embodiment of the present disclosure.

FIG. 1 is an assembled perspective view schematically a partial configuration of a battery pack according to an embodiment of the present disclosure. In addition, FIG. 2 is an exploded perspective view illustrating the partial configuration of the battery pack of FIG. 1.

Figure 2:
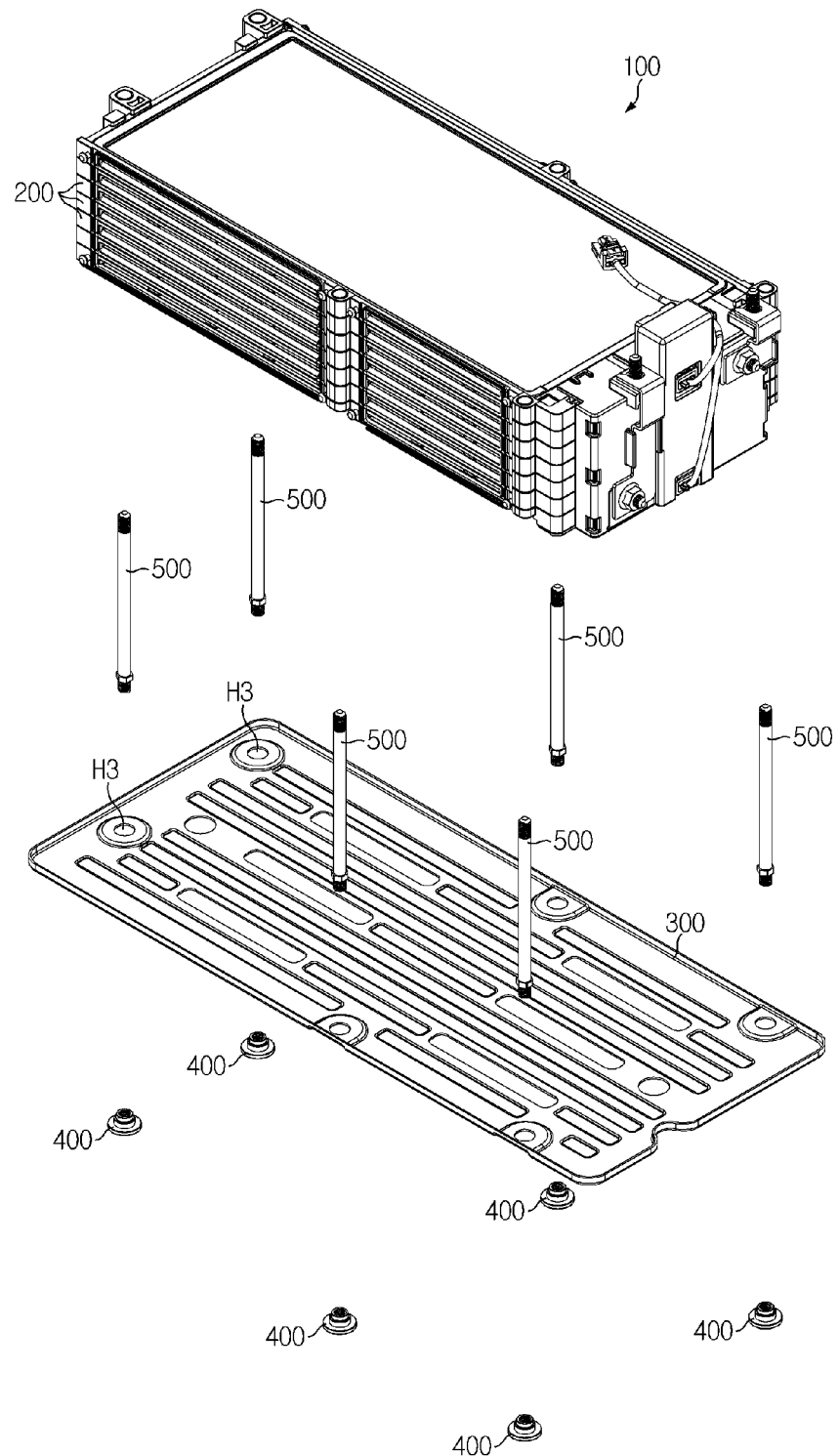
FIG. 2 is an exploded perspective view illustrating the configuration of the battery pack of FIG. 1.

Referring to FIGS. 1 and 2, the battery pack of the present disclosure may include a secondary cell 100, a cartridge 200, a lower end plate 300, a first fastening member 400, and a second fastening member 500. Although not clearly shown in FIGS. 1 and 2, the secondary cell 100 may be accommodated in the cartridge 200.

The secondary cell 100 is a component for storing or discharging electrical energy through charge and discharge operations. In particular, the secondary cell 100 may be a pouch-type secondary cell. The secondary cell 100 may include an electrode assembly, an electrolyte, and a pouch-type case. In addition, the secondary cells 100 of the present disclosure may be lithium secondary cells.

The electrode assembly may be formed by arranging at least one positive electrode plate and at least one negative electrode plate with a separator therebetween. More specifically, examples of the electrode assembly includes a wound-type electrode assembly in which one positive electrode plate and one negative electrode plate are wound together with a separator, and a stacked-type electrode assembly in which a plurality of positive electrode plates and a plurality of negative electrode plates are alternately stacked with separators therebetween.

In addition, the pouch-type case may include an external insulating layer, a metal layer, and an internal adhesive layer. The pouch-type case may include a thin metal film such as a thin aluminum film for protecting internal components such as the electrode assembly and the electrolyte, complementing the electrochemical properties of the electrode assembly and the electrolyte, and guaranteeing heat dissipation. In addition, the thin aluminum film may be placed between insulating layers formed of an insulating material, that is, between the external insulating layer and the internal adhesive layer, so as to electrically insulate internal components of the secondary cell 100 such as the electrode assembly and the electrolyte from other components located outside the secondary cell 100.

In particular, the pouch-type case may include two pouches, and a concave inner space may be formed in at least one of the two pouches. The electrode assembly may be accommodated in the inner space of the pouch. In addition, sealing portions may be provided on outer circumferential surfaces of the two pouches, and these sealing portions may be fused to each other to seal the inner space in which the electrode assembly is accommodated.

In addition, the electrode plates of the electrode assembly may be provided with electrode tabs, respectively, and at least one electrode tab may be connected to an electrode lead. In addition, the electrode lead may be disposed between the sealing portions of the two pouches and exposed to the outside of the pouch-type case, and thus the electrode lead may function as an electrode terminal of the secondary cell 100.

The battery pack of the present disclosure may include various secondary cells known at the time of filling the present application.

A plurality of secondary cells 100 may be included in the battery pack. In particular, the plurality of secondary cells 100 may be vertically arranged in a lying position such that relatively large surfaces of the secondary cells 100 may face upward and downward.

The cartridge 200 may accommodate the secondary cell 100 in an inner space thereof. In particular, the cartridge 200 may be configured to surround an outer portion of the secondary cell 100 from the outside of the secondary cell 100.

Figure 3:
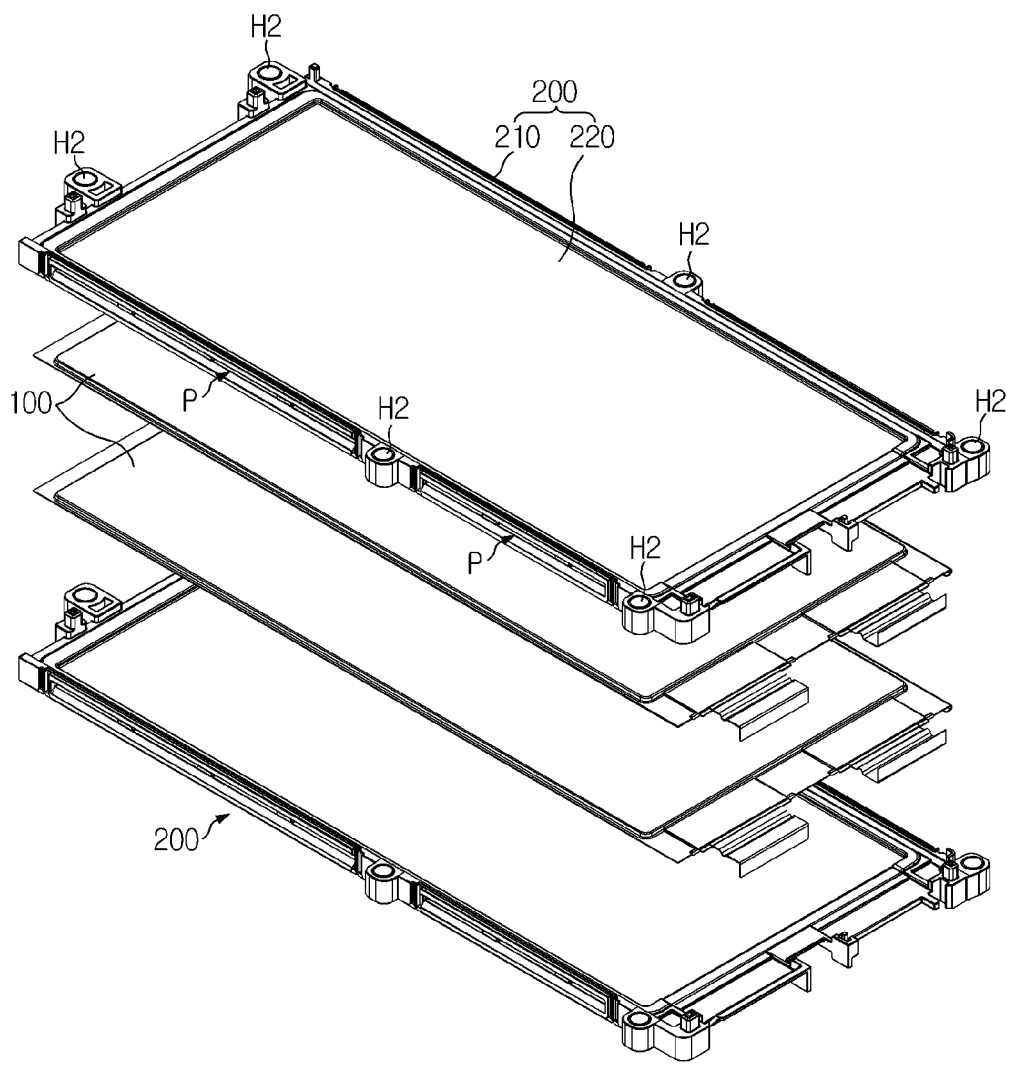
FIG. 3 is a perspective view schematically illustrating a configuration of cartridges and secondary cells according to an embodiment of the present disclosure.

FIG. 3 is a perspective view schematically illustrating a configuration of the cartridge 200 and the secondary cell 100 according to an embodiment of the present disclosure.

Referring to FIG. 3, the cartridge 200 may include a main frame 210 having a substantially tetragonal ring shape. In this case, the main frame 210 of the cartridge 200 may include four unit frames connected to each other at both ends thereof. The unit frames of the cartridge 200 may be separately manufactured and then assembled together, or may be manufactured in one piece from the beginning. The cartridge 200 may include a plastic material and may be manufactured by an injection molding method.

In addition, the secondary cell 100 may be a pouch-type secondary cell having a substantially tetragonal shape. In the present embodiment, the main frame 210 may have a tetragonal ring shape as described above, and the secondary cell 100 may be placed in a center empty space of the main frame 210 such that an edge portion the secondary cell 100 may be surrounded by the main frame 210. Therefore, the cartridge 200 may accommodate the secondary cell 100 and protect an outer side of the secondary cell 100.

In addition, the cartridge 200 may include a cooling plate 220 formed of a thermally conductive material and located in a center region thereof. For example, the cooling plate 220 of the cartridge 200 may be formed of aluminum and located in a center region of a tetragonal ring defined by the main frame 210. The cartridge 200 may include two cooling plates 220, that is, an upper plate and a lower plate that are spaced a predetermined distance from each other in a vertical direction. A flow path P may be formed between the two cooling plates 220 to allow a coolant such as air to flow along the flow path P. In the this cartridge structure, a secondary cell 100 may be placed on an upper side of the upper plate, and another secondary cell 100 may be placed on a lower side of the lower plate. In this case, it may be considered that one cartridge 200 accommodates two secondary cells 100. Heat generated from a secondary cell 100 may be transferred to an adjacent cooling plate 220 and dissipated to the outside by the coolant flowing along the flow path P between the cooling plates 220.

In addition, cartridges 200 may be configured to be placed one on top of another. In particular, a plurality of cartridges 200 may be included in the battery pack, and in this case the plurality of cartridges 200 may be stacked in a vertical direction as shown in FIG. 3. In this case, stacking surfaces of the cartridges 200, for example, upper and lower surfaces of the main frames may have concave and convex structures corresponding to each other. In this case, owing to the concave and convex structures of the cartridges 200, the cartridges 200 may be more reliably coupled to and fixed to each other, and it may be easy to assemble the cartridges 200 because the concave and convex structures function as guides.

As described above, the cartridges 200 may accommodate the pouch-type secondary cells 100 in inner spaces formed as the cartridges 120 are stacked, thereby limiting exposure of the secondary cells 100 to protect the secondary cells 100 from external physical or chemical agents, guiding arrangement of the pouch-type secondary cells 100, and preventing relative movement of a stack of the secondary cells 100.

In addition, each of the cartridges 200 may include a coupling hole formed in at least one side thereof. For example, as indicated by H2 in FIG. 3, each of the cartridges 200 may include a coupling hole vertically formed through at least one of the four unit frames or in a corner at which two unit frames meet each other.

As shown in FIG. 2, the lower end plate 300 may have a plate shape, that is, a wide plate shape. In addition, the lower end plate 300 may include a metallic material to have rigidity. For example, the lower end plate 300 may be a rectangular plate formed of steel.

In addition, the lower end plate 300 may be placed on a lower portion of a stack of the secondary cells 100 and the cartridges 200. That is, the lower end plate 300 may be placed on a lower portion of the stack in which the secondary cells 100 and the cartridges 200 are stacked, and may be coupled to the stack of the secondary cells 100 and the cartridges 200.

Therefore, the lower end plate 300 may protect the lower portion of the stack of the secondary cells 100 and the cartridges 200 and more securely fix the stack.

The first fastening member 400 may be fixedly coupled to the lower end plate 300. In particular, the first fastening member 400 may be provided in the form of a nut as shown in FIG. 2. In this case, at least a portion of an outer circumferential surface of the first fastening member 400 may have a polygonal shape, and an inner circumferential surface of the first fastening member 400 may have a circular shape. In addition, a thread may be formed on the inner surface of the first fastening member 400.

In addition, the second fastening member 500 may be coupled to the first fastening member 400.

Figure 4:
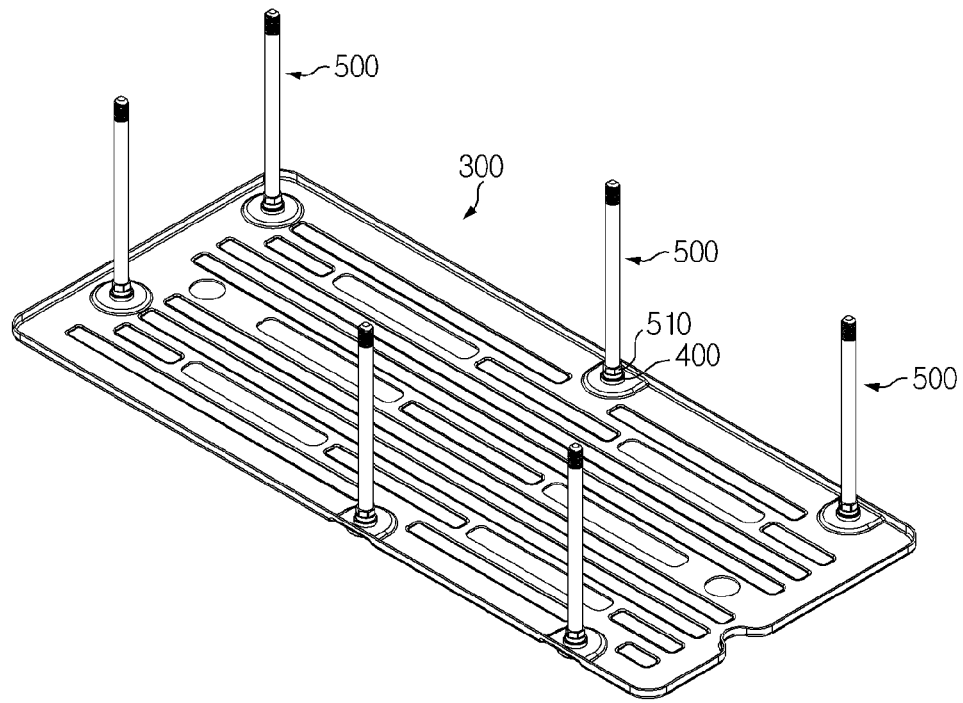
FIG. 4 is a view schematically illustrating an assembly of a lower end plate, a first fastening member, and a second fastening member.

FIG. 4 is a view schematically illustrating an assembly configuration of the lower end plate 300, the first fastening member 400, and the second fastening member 500 according to an embodiment of the present disclosure. In addition, FIG. 5 is a top view of the assembly shown in FIG. 4, and FIG. 6 is a cross-sectional view taken along line A1-A1' of FIG. 5.

Figure 5:
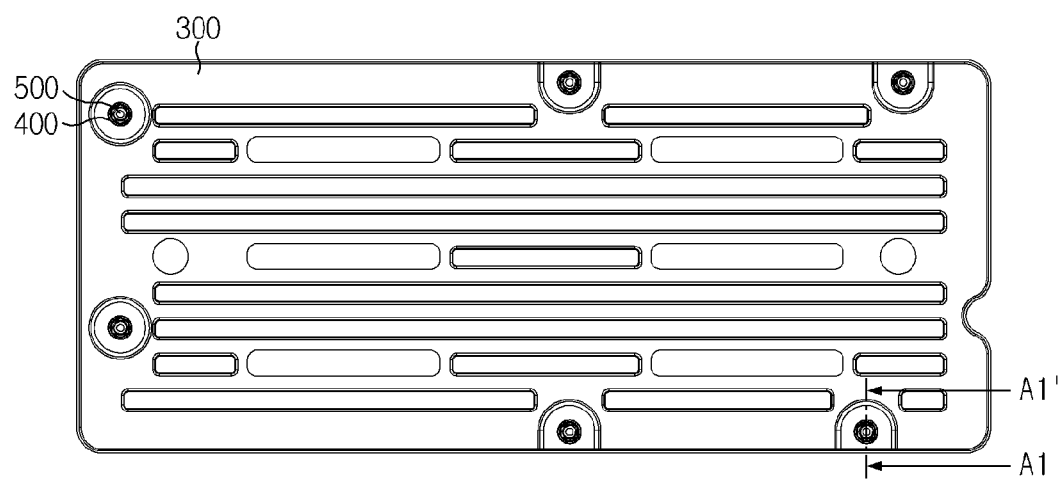
FIG. 5 is a top view of the assembly shown in FIG. 4.
Figure 6:
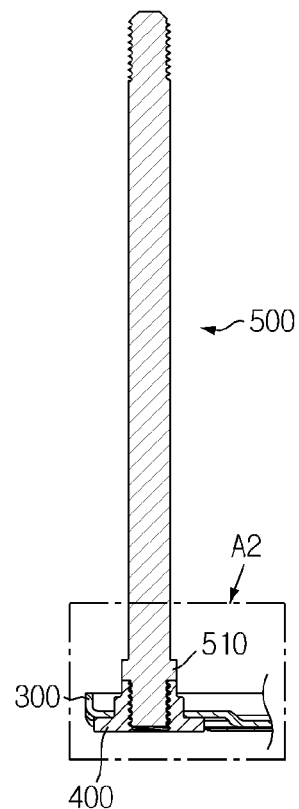
FIG. 6 is a cross-sectional view taken along line A1-A1' of FIG. 5.

Referring to FIGS. 4 to 6, the second fastening member 500 may extend in one direction. For example, the second fastening member 500 may have a rod shape. In particular, as shown in the drawings, the length direction of the second fastening member 500 may be parallel to the direction in which the cartridges 200 are stacked. That is, the second fastening member 500 may stand in a vertical direction. In addition, the second fastening member 500 may stand on the lower end plate 300 in a direction perpendicular to the lower end plate 300.

A lower end portion of the second fastening member 500 may be coupled to the first fastening member 400. As shown in FIG. 6, the first fastening member 400 is fixed to the lower end plate 300. Therefore, the second fastening member 500 may also be fixedly coupled to the lower end plate 300.

In particular, the second fastening member 500 may be provided in the form of a bolt, for example, a long bolt extending in one direction. For example, the second fastening member 500 may have a shape such as a circular shape corresponding to the inner circumferential surface of the first fastening member 400 having a nut shape, and an outer circumferential surface of the lower end portion of the second fastening member 500 may be threaded. In this case, the lower end portion of the second fastening member 500 having a bolt shape may be inserted into the first fastening member 400 having a nut shape.

In addition, the second fastening member 500 may be inserted through the coupling holes H2 of the cartridges 200. For example, as shown in FIG. 1, the second fastening member 500 may be inserted through coupling holes H2 respectively formed in the plurality of cartridges 200 stacked in a vertical direction. In addition, owing to the second fastening member 500 inserted through the cartridges 200, the cartridges 200 may be fixedly coupled to the lower end plate 300, and the cartridges 200 may be fixedly coupled to each other such that relative movement of the secondary cells 100 accommodated in the cartridges 200 may be limited.

In addition, threads may be formed on both ends of the second fastening member 500. That is, as shown in FIGS. 2 and 6, threads may be formed not only on the lower end portion of the second fastening member 500 but also on an upper end portion of the second fastening member 500. In this case, the second fastening member 500 may be coupled to the first fastening member 400 using the thread formed on the lower end portion of the second fastening member 500 and may be coupled to a third fastening member using the thread formed on the upper end portion of the second fastening member 500. In this case, the third fastening member may be provided in the form of a nut like the first fastening member 400.

According to this configuration of the present disclosure, since the first fastening member 400 and the third fastening member are coupled to the threads formed on the lower and upper end portions of the second fastening member 500, intervening components such as the cartridges 200 and the lower end plate 300 may be fixed.

Preferably, the first fastening member 400 may be fixed to the lower end plate 300 by a welding method. In addition, as the second fastening member 500 is coupled to the first fastening member 400 welded and fixed to the lower end plate 300, the second fastening member 500 may be fixed to the lower end plate 300. For example, at least a portion of the outer circumferential surface of the first fastening member 400 having a nut shape may be welded to the lower end plate 300. In addition, the second fastening member 500 having a bolt shape may be coupled to the inner circumferential surface of the first fastening member 400 by rotating the second fastening member 500 along the thread of the inner circumferential surface of the first fastening member 400.

According to this configuration of the present disclosure, since the first fastening member 400 and the lower end plate 300 are welded to each other, the fixing strength between the first fastening member 400 and the lower end plate 300 may be stably maintained. In addition, since there is little possibility that the first fastening member 400 is separated from the lower end plate 300 during use of the battery pack, the coupling between the first fastening member 400 and the lower end plate 300 and between the first fastening member 400 and the second fastening member 500 may be stably maintained.

In particular, according to this configuration, the second fastening member 500 may not be welded to the lower end plate 300. Therefore, the second fastening member 500 may not be deformed or damaged by welding, and thus the second fastening member 500 may not be deviated from a right-angle position. In addition, since the first fastening member 400 having a relatively short length is welded instead of welding the second fastening member 500 having a relatively long length in one direction, the second fastening member 500 may be more easily positioned at right angles to the lower end plate 300.

In addition, preferably, at least a portion of the first fastening member 400 may be inserted into a through-hole of the lower end plate 300 and may then be welded and fixed to a lower surface of the lower end plate 300. This will be described in more detail with reference to FIG. 7.

Figure 7:
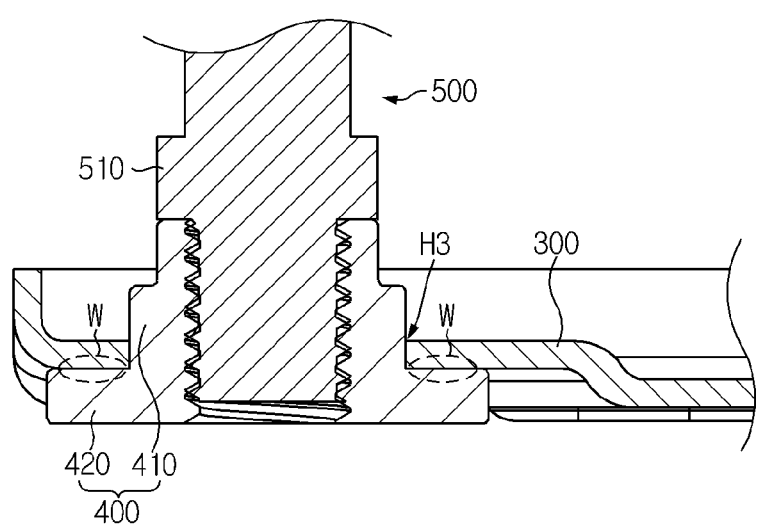
FIG. 7 is an enlarged view illustrating a portion A2 of FIG. 6.

FIG. 7 is an enlarged view illustrating a portion A2 of FIG. 6.

Referring to FIG. 7, as indicated by H3, a through-hole may be vertically formed through a side portion of the lower end plate 300. In addition, the first fastening member 400 may include an insertion portion 410 and a welding portion 420. In this case, the insertion portion 410 and the welding portion 420 may be physically separate or may be separable from each other. However, as shown in FIG. 7, the insertion portion 410 and the welding portion 420 may be provided in one piece and thus may not be separable from each other.

First, the insertion portion 410 of the first fastening member 400 may be inserted into the through-hole H3 of the lower end plate 300. For example, the insertion portion 410 of the first fastening member 400 may have a polygonal columnar shape with a size equal to or smaller than the through-hole H3. In addition, the insertion portion 410 may be inserted through the through-hole H3, and an upper end of the insertion portion 410 may protrude upward from the lower end plate 300.

Next, the welding portion 420 of the first fastening member 400 may be positioned below the lower end plate 300 and welded to the lower surface of the lower end plate 300. In particular, the welding portion 420 may be larger than the insertion portion 410 and thus may not be inserted through the through-hole H3. That is, the welding portion 420 may be stopped at the through-hole H3. In addition, an upper surface of the welding portion 420 larger than the insertion portion 410 may be brought into contact with the lower surface of the lower end plate 300, and the contact portions may be welded together. For example, the welding portion 420 of the first fastening member 400 may be stopped by the lower surface of the lower end plate 300 at a position indicated by W in FIG. 7, and the upper surface of the welding portion 420 may be fixed to the lower surface of the lower end plate 300 by a method such as a laser welding method.

According to this configuration of the present disclosure, the first fastening member 400 may be stably fixed to the lower end plate 300, and welding may be smoothly performed. Therefore, when the battery pack is manufactured, a process of welding the first fastening member 400 to the lower end plate 300 may be easily performed, and when the battery pack is used, the first fastening member 400 may not be separated from the lower end plate 300. In addition, the second fastening member 500 coupled to the first fastening member 400 may be stably maintained at a right-angle position with high fixing strength.

In addition, preferably, the second fastening member 500 may have a cylindrical shape as shown in the drawings. In addition, a protrusion 510 having a polygonal shape may be provided on an outer circumferential surface of at least a portion of the second fastening member 500.

For example, as shown in FIGS. 4, 6, and 7, the second fastening member 500 may have a cylindrical shape as a whole, and the protrusion 510 having a polygonal columnar shape may be formed on a portion of the second fastening member 500. For example, an outer circumferential surface of the protrusion 510 of the second fastening member 500 may have a hexagonal columnar shape. In addition, when the first fastening member 400 and the second fastening member 500 are coupled to each other in a rotating manner, the protrusion 510 of the second fastening member 500 may be positioned in contact with an upper portion of the first fastening member 400.

According to this configuration of the present disclosure, the second fastening member 500 having a cylindrical shape may be smoothly inserted through the coupling holes H2 of the cartridges 200 and bought into tight contact with inner surfaces of the coupling holes H2. In addition, owing to the polygonal shape of the protrusion 510 of the second fastening member 500, the second fastening member 500 may be more easily coupled to the first fastening member 400. For example, the second fastening member 500 may be easily rotated by using a coupling tool such as a wrench on the protrusion 510 having a hexagonal shape of the second fastening member 500. In addition, since the protrusion 510 is formed on a portion of the second fastening member 500 close to the first fastening member 400, the second fastening member 500 may be easily rotated while applying a sufficiently rotating force to the second fastening member 500.

Figure 8:
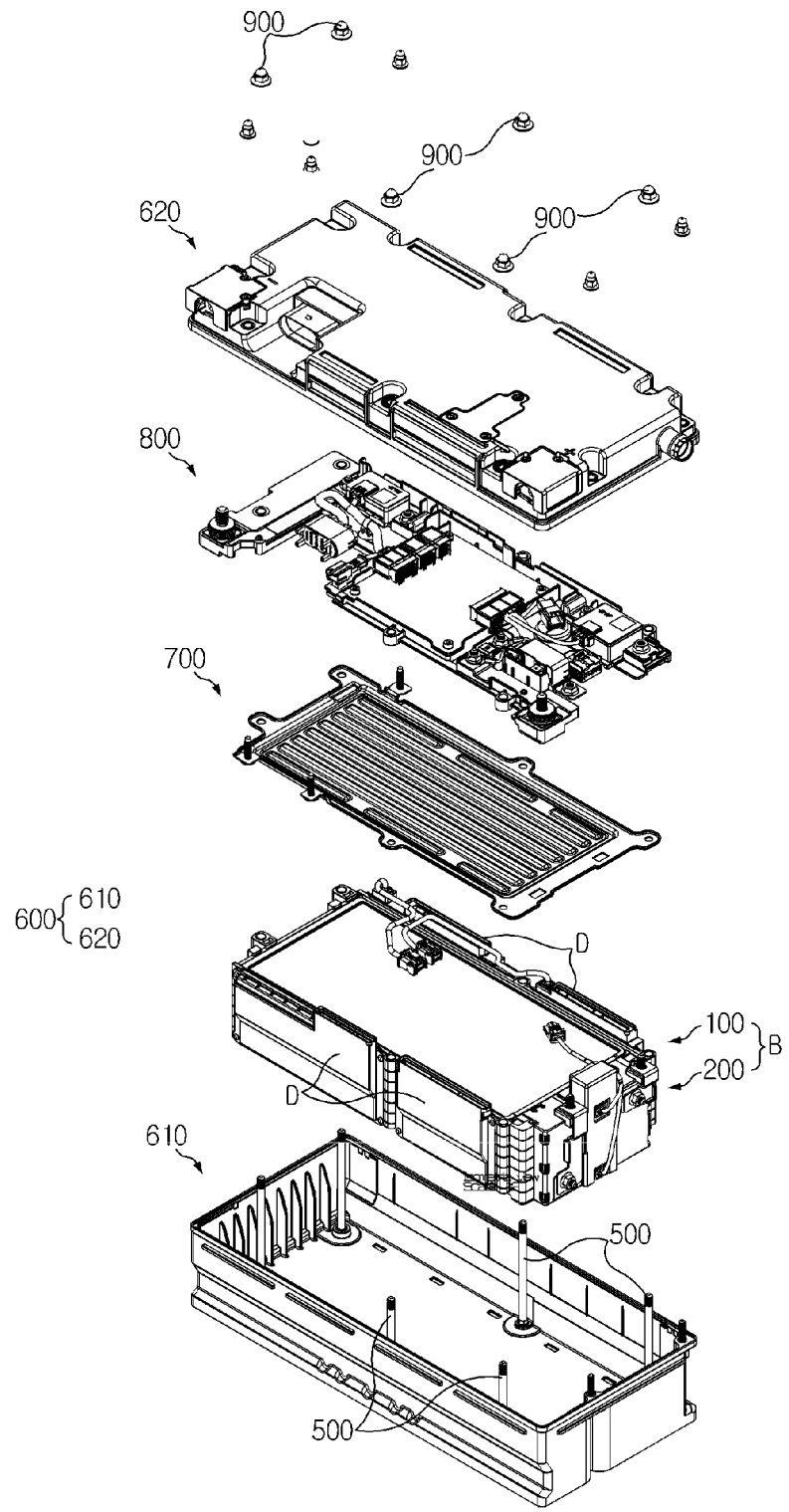
FIG. 8 is an exploded perspective view schematically illustrating a configuration of the battery pack according to an embodiment of the present disclosure.
Figure 9:
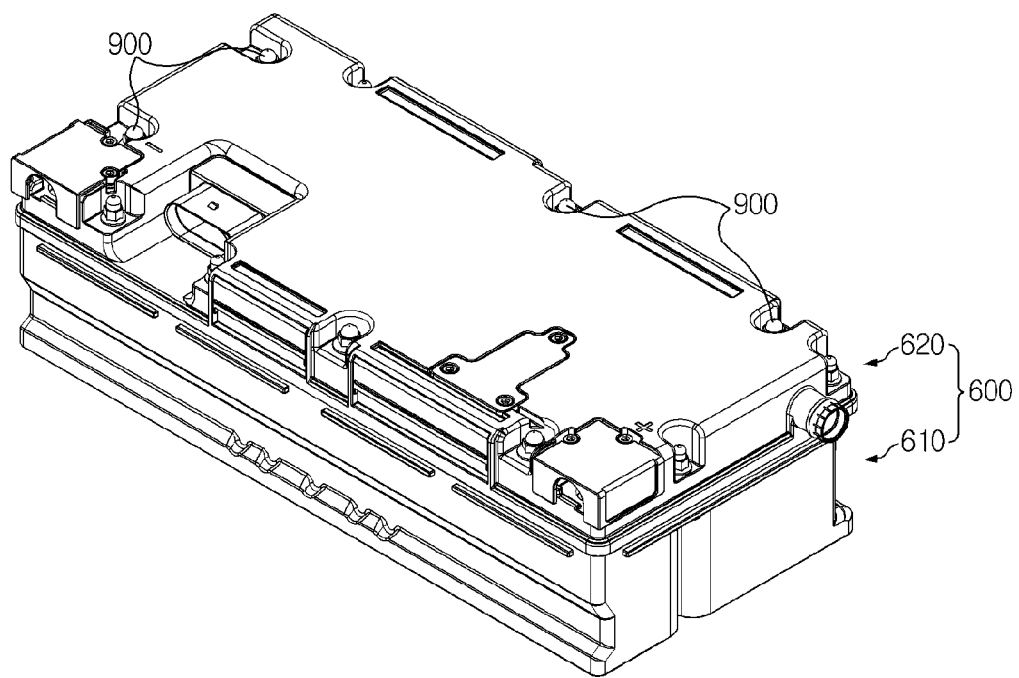
FIG. 9 is an assembled perspective view illustrating the battery pack shown in FIG. 8.

FIG. 8 is an exploded perspective view schematically illustrating a configuration of the battery pack according to an embodiment of the present disclosure, and FIG. 9 is an assembled perspective view illustrating the battery pack shown in FIG. 8.

Referring to FIGS. 8 and 9, according to the embodiment of the present disclosure, the battery pack may further include a pack case 600.

The pack case 600 may have an empty inner space, and the secondary cell 100 and the cartridge 200 may be accommodated in the inner space. In particular, as described above, a plurality of secondary cells 100 and a plurality of cartridges 200 may be stacked to form a stack B, and the stack B of the secondary cells 100 and the cartridges 200 may be accommodated in the inner space of the pack case 600.

In addition, the pack case 600 may include an upper case 620 and a lower case 610. In this case, the lower case 610 may have an inner space and an open upper side. In addition, the upper case 620 may be coupled to the open upper side of the lower case 610 to seal the open upper side. In this case, a sealing member such as a rubber pad may be provided between edge contact portions of the upper case 620 and the lower case 610, so as to improve sealing therebetween.

Figure 10:
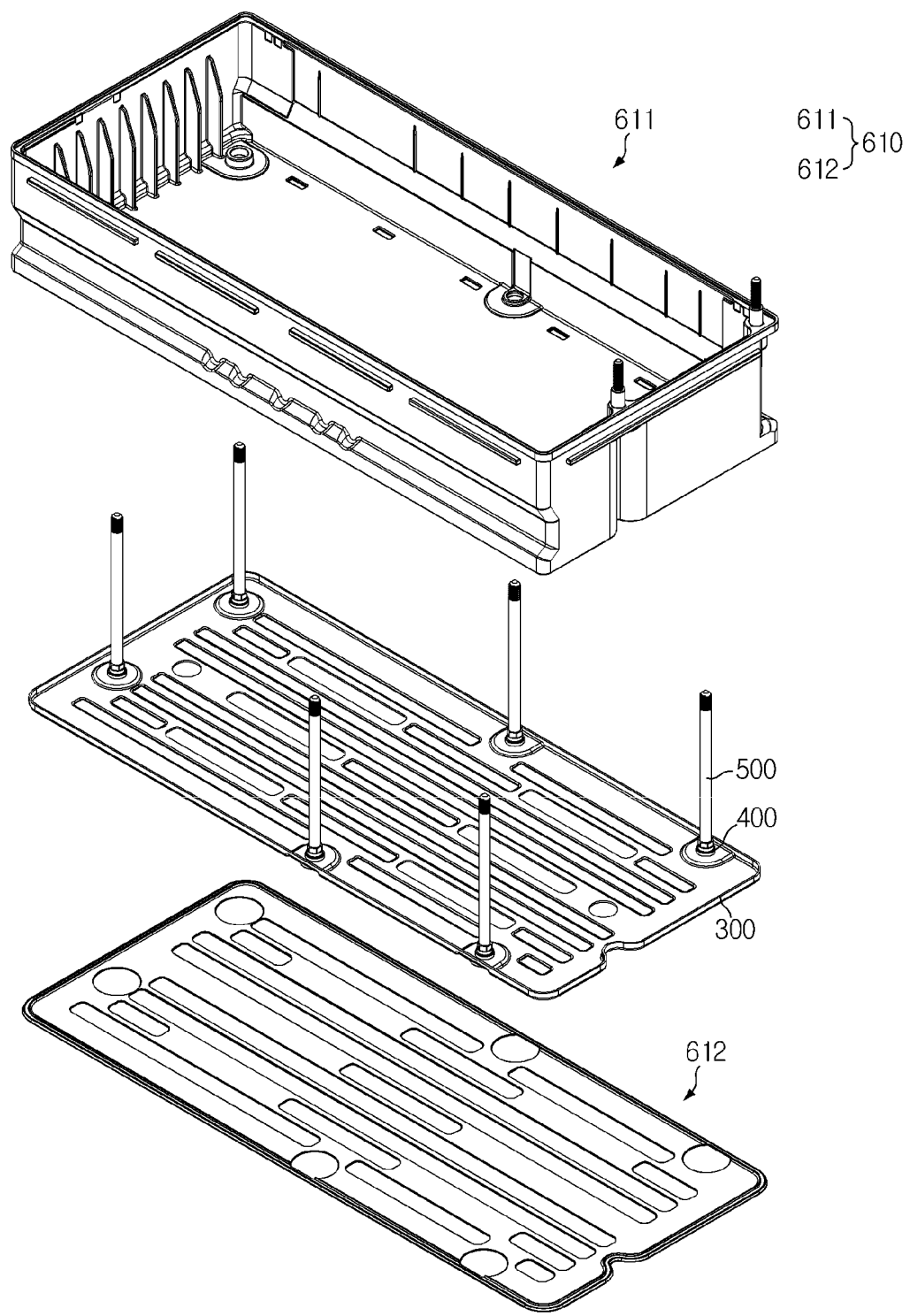
FIG. 10 is an exploded perspective view schematically illustrating a configuration of a lower case and a lower end plate according to an embodiment of the present disclosure.

FIG. 10 is an exploded perspective view schematically illustrating a configuration of the lower case 610 and the lower end plate 300 according to an embodiment of the present disclosure.

Referring to FIG. 10, the lower end plate 300 and the first fastening member 400 may be embedded in the lower case 610. That is, the lower case 610 may include: a lower housing 611 formed of a polymer material and having an inner space closed on lower and lateral sides thereof and opened on an upper side thereof; and a lower cover 612 configured to be coupled to a lower portion of the lower housing 611 and formed of a plate-shaped polymer material. The lower end plate 300 and the first fastening member 400 may be placed between the lower housing 611 and the lower cover 612.

The lower cover 612 may be fixedly coupled to the lower housing 611 by a laser welding method. In this case, the lower cover 612 may transmit a laser beam, and the lower housing 611 may absorb the laser beam. For example, edge portions of the lower cover 612 and the lower housing 611 may be fused to each other by a laser welding method.

Alternatively, the lower cover 612 and the lower housing 611 may be formed by an insert injection molding method in a state in which the lower end plate 300 to which the first fastening member 400 is fixed is placed between the lower cover 612 and the lower housing 611. Alternatively, the lower cover 612 may be formed by a molding method.

In this configuration, the second fastening member 500 may protrude into the inner space of the lower case 610. In addition, since a lower end of the second fastening member 500 is firmly fixed to the first fastening member 400 embedded in the lower case 610, the second fastening member 500 may be inserted through the lower housing 611 into the inner space of the lower housing 611.

According to this configuration of the present disclosure, since the lower case 610 mainly include a polymer material, the electrical insulation, lightness, and formability of the lower case 610 may be easily guaranteed, and owing to the lower end plate 300 embedded in the lower case 610, the rigidity and sealing of the lower case 610 may be enhanced. In addition, since fixing between the first fastening member 400 and the lower end plate 300 is stably maintained, coupling between the lower end plate 300 and the cartridges 200 may also be stably maintained. In addition, since a space or a part such as a bolt or a nut is not required to fix the lower end plate 300 and the lower case 610 to each other, the spatial efficiency and manufacturing processability of the battery pack may be improved.

Preferably, as shown in FIGS. 8 and 9, the second fastening member 500 may protrude upward from the upper case 620, and an upper end portion of the second fastening member 500 may be coupled to a third fastening member 900. That is, when the upper case 620 covers the open upper side of the lower case 610, an upper end of the second fastening member 500 may be exposed to the outside of the upper case 620, and the third fastening member 900 may be coupled to the exposed upper end of the second fastening member 500.

To this end, a thread may be formed on an upper outer circumferential surface of the second fastening member 500. In addition, the third fastening member 900 may be provided in the form of a nut having a thread formed on an inner circumferential surface thereof. In this case, the second fastening member 500 and the third fastening member 900 may be coupled to each other by a rotation along the threads.

According to this configuration of the present disclosure, the upper case 620 may be fixed using the second fastening member 500, and thus fastening parts or spaces may not be required or decreased between the upper case 620 and the lower case 610. Therefore, the manufacturing costs and time of the battery pack may be reduced, and the size of the battery pack may be more easily reduced. In addition, according to the embodiment in which the lower end plate 300 and the first fastening member 400 is embedded in the lower case 610, the fixing strength between the lower case 610 and the upper case 620 may be further improved by the second fastening member 500.

In addition, preferably, the battery pack of the present disclosure may further include an upper end plate 700 as shown in FIG. 8.

The upper end plate 700 may have a plate shape and may be formed of a metallic material such as steel. In addition, the upper end plate 700 may be placed on an upper portion of the stack B of the secondary cells 100 and the cartridges 200. Therefore, since the upper end plate 700 covers upper portions of the secondary cells 100 and the cartridges 200, it may be possible to securely fix the stack B, enhance the rigidity of the stack B, maintain the surface pressure of the stack B, and protect the stack B from external impacts.

In particular, the second fastening member 500 may be inserted through the upper end plate 700. That is, the second fastening member 500 may be inserted through the coupling holes H2 of the cartridges 200 and the upper end plate 700 as well.

According to this configuration of the present disclosure, fastening parts or spaces for fixing the pack case 600 or the cartridges 200 to the upper end plate 700 may be decreased in number or may not be used. Therefore, in this case, manufacturing processes may be simplified, manufacturing costs and times may be reduced, and the inner space of the battery pack may be more efficiently used.

In addition, preferably, the battery pack of the embodiment of the present disclosure may further include an electronic-component plate 800 as shown in FIG. 8. The electronic-component plate 800 may have a plate shape, and at least one electric component such as a BMS, a current sensor, a relay, and a fuse may be mounted on the electronic-component plate 800. The electronic-component plate 800 may be electrically connected to secondary cells 100.

Here, the BMS refers to a battery management system configured to control charge and discharge operations of the battery pack. In general, such a BMS is included in a battery pack. The current sensor is a component configured to sense charge and discharge currents of the battery pack. The relay is a switching device configured to selectively open and close a charge/discharge path through which charge and discharge currents of the battery pack flow. In addition, the fuse is provided along the charge/discharge path of the battery pack, and if an abnormal situation occurs, the fuse melts and blocks charge/discharge current of the battery pack. The current sensor, the relay, and the fuse may exchange information with the BMS, and may be controlled by the BMS.

The electronic-component plate 800 may be placed on an upper portion of the stack B of the secondary cells 100 and the cartridges 200. In addition, in the embodiment in which the upper end plate 700 is provided on an upper portion of the stack B of the secondary cells 100 and the cartridges 200, the electronic-component plate 800 may be placed on an upper portion of the upper end plate 700. According to this configuration of the present disclosure, electric components may be easily mounted, assembled, and replaced.

In addition, the second fastening member 500 may be inserted through the electronic-component plate 800. That is, the second fastening member 500 may be inserted through the coupling holes H2 of the cartridges 200, the upper end plate 700, and the electronic-component plate 800 as well.

According to this configuration of the present disclosure, fastening parts or spaces for fixing the electronic-component plate 800 inside the pack case 600 may be decreased in number or may not be used. Therefore, in this case, manufacturing processes may be simplified, manufacturing costs and times may be reduced, and the inner space of the battery pack may be more efficiently used.

In addition, the battery pack of the present disclosure may further include a duct D for allowing a coolant such as air to flow into and out of the stack B of the secondary cells 100 and the cartridges 200. In particular, the duct D may include an inlet duct for introducing the coolant into the stack B of the secondary cells 100 and the cartridges 200, and an outlet duct for discharging the coolant from the stack B of the secondary cells 100 and the cartridges 200. The inlet duct and the outlet duct may be located at opposite sides for smooth flow of the coolant.

Furthermore, the coolant introduced through the inlet duct may flow between the secondary cells 100. In particular, each of the cartridges 200 may include two cooling plates 220 spaced a predetermined distance from each other, and the coolant may be introduced through gaps between the cooling plates 220. The coolant flowing through the gaps between the cooling plates 220 of the cartridges 200 may be discharged to the outside through the outlet duct.

The battery pack of the present disclosure may further include other elements in addition to the above-described elements. For example, the battery pack of the present disclosure may further include a bus bar for transmitting charge or discharge power to or from a cell assembly, a cable for transmitting electric signals, and a power terminal for connection to an external charge/discharge device.

The battery pack of the present disclosure may be applied to automobiles such as electric or hybrid vehicles. That is, according to the present disclosure, an automobile may include the battery pack according to the present disclosure. In particular, factors such as improving the energy density of the battery pack by efficiently using battery pack spaces, guaranteeing the durability of the battery pack in environments such as impact and vibration, and reducing the weight and size of the battery pack may be important for automobiles such as electric vehicles obtaining power from batteries. Therefore, when the battery pack of the present disclosure is applied to such an automobile, these factors may be satisfied.

Figure 11:
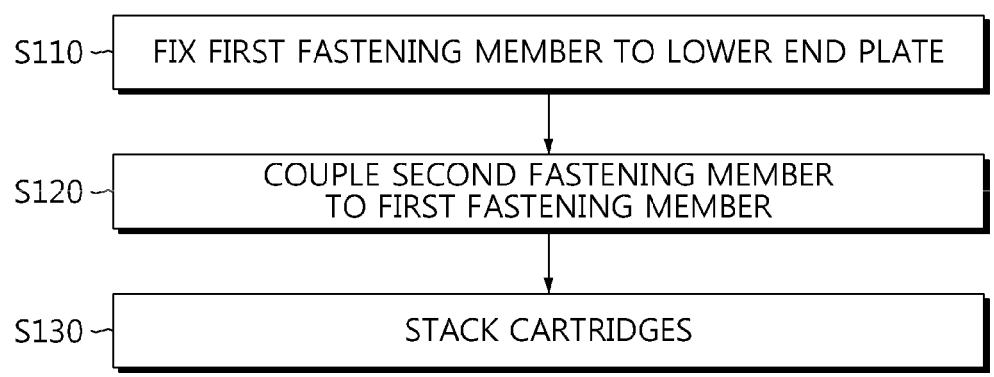
FIG. 11 is a flowchart schematically illustrating a method of manufacturing a battery pack according to an embodiment of the present disclosure.

FIG. 11 is a flowchart schematically illustrating a method of manufacturing a battery pack according to an embodiment of the present disclosure.

Referring to FIG. 11, the method of manufacturing a battery pack includes fixing a first fastening member 400 (S110), coupling a second fastening member 500 (S120), and stacking cartridges 200 (S130).

In operation step S110, the first fastening member 400 is fixed to a lower end plate 300 formed of a plate-shaped metallic material.

In operation step S120, the second fastening member 500 is coupled to the first fastening member 400. Particularly, in operation step S120, the second fastening member 500 having a shape extending in one direction may stand on the lower end plate 300 in a direction perpendicular to the lower end plate 300.

In operation step S130, the cartridges 200 are stacked while accommodating secondary cells 100 in inner spaces of the cartridges 200. Particularly, in operation step S130, the second fastening member 500 may be inserted through coupling holes of the cartridges 200.

Preferably, in operation step S110, the first fastening member 400 may be welded to a lower portion of the lower end plate 300.

In addition, preferably, before operation step S130, particularly between operation steps S120 and S130, the method may further include an operation step of embedding the lower end plate 300 and the first fastening member 400 in a lower case 610. In this case, the lower case 610 may have an inner space and an open upper side. For example, the embedding operation step may be performed as shown in FIG. 10.

Furthermore, after operation step S130, the method may further include an operation step of placing an upper end plate 700, which is formed of a plate-shaped metallic material, on an upper portion of a stack of the secondary cells 100 and the cartridges 200. In this case, the second fastening member 500 may be inserted through the upper end plate 700.

In addition, after operation step S130, the method may further include an operation step of placing an electronic-component plate 800, on which at least one of a BMS, a current sensor, a relay, and a fuse is mounted, on the upper portion of the stack of the secondary cells 100 and the cartridges 200. In this case, the second fastening member 500 may be inserted through the electronic-component plate 800. In addition, if the battery pack includes the upper end plate 700, the electronic-component plate 800 may be placed on an upper end of the upper end plate 700.

In addition, after the operation step S130, the method may further include an operation step of coupling an upper case 620 to the open upper side of the lower case 610 in a state in which the second fastening member 500 is inserted through the upper case 620, and an operation step of coupling a third fastening member 900 to an upper end of the second fastening member 500 protruding upward from an upper portion of the upper case 620.

While embodiments of the present disclosure has been described with reference to the accompanying drawings, it should be understood that the embodiments are given by way of illustration only, and various changes and modifications within the scope of the disclosure as defined by the appended claims will become apparent to those skilled in the art.

In the present disclosure, terms indicating directions such as upward and downward are used to express relative positions. These terms are for ease of description, and it will be apparent to those skilled in the art that these terms may vary depending on the position of an object or an observer.

What is claimed is:
1. A battery pack comprising:
    a plurality of secondary cells arranged in a vertical direction, each of the secondary cells comprising an electrode assembly, an electrolyte, and a pouch-type case;
    a plurality of cartridges accommodating the secondary cells in inner spaces thereof, comprising coupling holes, and stacked in the vertical direction;

a lower end plate comprising a plate-shaped metallic material and placed on a lower portion of a stack of the secondary cells and the cartridges;

a first fastening member fixed to the lower end plate; and a second fastening member having an elongated shape so as to stand on the lower end plate in a direction perpendicular to the lower end plate, a lower end portion of the second fastening member being coupled to the first fastening member, the second fastening member passing through the coupling holes of the cartridges, wherein a lower portion of the lower end plate has a recess and a through-hole formed in the recess, and wherein the first fastening member further comprises:
 an insertion portion inserted in the through-hole of the lower end plate; and
 a welding portion placed on a lower surface of the recess in the lower end plate and welded to the lower surface of the recess in the lower end plate.

2. The battery pack of claim 1, wherein the first fastening member comprises a nut, and the second fastening member comprises a bolt.

3. The battery pack of claim 2, wherein threads are formed on both ends of the second fastening member, and the thread formed on a lower end of the second fastening member is coupled to a thread of the first fastening member.

4. The battery pack of claim 1, wherein the second fastening member has a cylinder shape and comprises a polygonal protrusion on at least a portion thereof along an outer circumferential surface of the second fastening member.

5. The battery pack of claim 1, further comprising a pack case accommodating the secondary cells and the cartridges in an inner space thereof.

6. The battery pack of claim 5, wherein the pack case comprises:
 a lower case comprising an empty inner space and an open upper side; and
 an upper case coupled to the open upper side of the lower case to seal the open upper side.

7. The battery pack of claim 6, wherein the lower end plate and the first fastening member are embedded in the lower case, and the second fastening member protrudes into the inner space of the lower case.

8. The battery pack of claim 6, wherein the second fastening member protrudes upward from the upper case, and an upper end portion of the second fastening member is coupled to a third fastening member.

9. The battery pack of claim 1, further comprising an upper end plate comprising a plate-shaped metallic material and placed on an upper portion of the stack of the secondary cells and the cartridges to cover upper portions of the secondary cells and the cartridges, and the second fastening member is passed through the upper end plate.

10. The battery pack of claim 1, further comprising an electronic-component plate having a plate shape and provided on an upper portion of the stack of the secondary cells and the cartridges, at least one of a BMS, a current sensor, a relay, and a fuse being mounted on the electronic-component plate, wherein the second fastening member is inserted through the electronic-component plate.

11. An automobile comprising the battery pack of claim 1.

12. A method of manufacturing a battery pack, the method comprising:

fixing a first fastening member to a lower end plate comprising a plate-shaped metallic material;

coupling a second fastening member extending long in one direction to the first fastening member in such a manner that the second fastening member stands on the lower end plate in a direction perpendicular to the lower end plate; and stacking cartridges in such a manner that the cartridges accommodate secondary cells and the second fastening member is passed through coupling holes of the cartridges, wherein a lower portion of the end plate has a recess and a through-hole formed in the recess, wherein the first fastening member further comprises:
 an insertion portion; and
 a welded portion, and, wherein the method includes inserting the insertion portion in the through-hole of the lower end plate; and welding the welded portion on a lower surface of the recess in the lower end plate.

13. The method of claim 12, wherein between the coupling of the second fastening member and the stacking of the cartridges, the method further comprises embedding the lower end plate and the first fastening member in a lower case having an inner space and an open upper side.

14. The method of claim 12, wherein after the stacking of the cartridges, the method further comprises:

coupling an upper case to an open upper side of a lower case in a state in which the second fastening member is inserted through the upper case; and coupling a third fastening member to an upper end of the second fastening member protruding upward from the upper case.

* * * * *